US009210507B2

(12) United States Patent
Hetherington

(10) Patent No.: US 9,210,507 B2
(45) Date of Patent: Dec. 8, 2015

(54) MICROPHONE HISS MITIGATION

(71) Applicant: QNX Software Systems Limited, Kanata (CA)

(72) Inventor: Phillip Alan Hetherington, Port Moody (CA)

(73) Assignee: 2236008 Ontartio Inc., Waterloo, Ontario (CA)

( * ) Notice: Subject to any disclaimer, the term of this patent is extended or adjusted under 35 U.S.C. 154(b) by 312 days.

(21) Appl. No.: 13/753,218

(22) Filed: Jan. 29, 2013

(65) Prior Publication Data

US 2014/0211955 A1 Jul. 31, 2014

(51) Int. Cl.

*H04B 3/20* (2006.01)
*H04B 15/00* (2006.01)
*H04R 3/04* (2006.01)
*G10L 21/0208* (2013.01)
*H04R 3/02* (2006.01)

(52) U.S. Cl.

CPC .............. *H04R 3/04* (2013.01); *G10L 21/0208* (2013.01); *H04R 3/02* (2013.01); *H04R 2410/00* (2013.01); *H04R 2410/03* (2013.01); *H04R 2430/03* (2013.01)

(58) Field of Classification Search

None
See application file for complete search history.

(56) References Cited

U.S. PATENT DOCUMENTS 5,839,101 A * 11/1998 Vahatalo et al. .............. 704/226
5,937,377 A 8/1999 Hardiman et al.
2002/0152066 A1* 10/2002 Piket ............................. 704/226
2005/0278171 A1 12/2005 Suppappola et al.
2007/0156399 A1 7/2007 Matsuo
2007/0223733 A1* 9/2007 Shuttleworth et al. ........ 381/94.1
2010/0202631 A1* 8/2010 Short ............................ 381/104
2010/0318353 A1* 12/2010 Bizjak ........................... 704/231

FOREIGN PATENT DOCUMENTS

EP 1 739 657 A2 1/2007
WO WO 2011/159858 A1 12/2011

OTHER PUBLICATIONS

Dreiseitel, Pia et al., "Speech Enhancement for Mobile Telephony Based on Non-Uniformly Spaced Frequency Resolution," EUSIPCO 1998, IEEE, Sep. 8, 1998, pp. 1-4.
Office Action Examination Report for corresponding European Application No. 13153113.9, dated Aug. 19, 2015, 6 pages.

* cited by examiner

*Primary Examiner* — Andrew L Sniezek
(74) *Attorney, Agent, or Firm* — Brinks Gilson & Lione

(57) ABSTRACT

A system and method for mitigating microphone hiss may obtain a frequency spectrum characteristic for a microphone. A microphone that has limited dynamic range may create microphone hiss in an output signal. The microphone hiss may prevent a reproduction of a sound field, represented in an output signal of the microphone, from being perceived as a natural environment. The microphone frequency spectrum may be obtained using static measurements or calculated dynamically. A virtual noise floor may be calculated responsive to the microphone frequency spectrum and a desired noise floor. Gain coefficients may be calculated responsive to the output signal of the microphone. The gain coefficients may be calculated to mitigate undesirable signal content including background noise and echoes. The calculated gain coefficients may be modified responsive to the virtual noise floor. The modified gain coefficients may allow a reproduction of the sound field to be perceived as a natural environment.

20 Claims, 4 Drawing Sheets

MICROPHONE HISS MITIGATION

BACKGROUND

1. Technical Field

The present disclosure relates to the field of noise control in audio signals. In particular, to a system and method for mitigating microphone hiss.

2. Related Art

There are many types of microphones each designed for different applications. Microphones may be selected for an application based on factors including cost, size and the dynamic range over a specified frequency range. For example, a microphone utilized in a professional recording application may have a large dynamic range close to the range of human perception from 0 Hz to 16 kHz. The microphone utilized in a mobile phone may have an acceptable dynamic range for speech content from 0 Hz to 5 kHz. The microphones utilized in the mobile phone may be selected for cost reasons but often the dynamic range over a give frequency range may be limited because of the physical size of the microphone.

Mobile phones, and many other computing devices, utilize small microphones because of the small physical size of the computing devices. Physically small microphones may have limitations in the dynamic range over a given frequency range. The limited dynamic range may be audible even in the presence of a completely silent environment. The limited dynamic range of a small microphone at higher frequencies will be perceived as hiss noise.

BRIEF DESCRIPTION OF DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for mitigating microphone hiss may obtain a frequency spectrum characteristic for a sound input transducer such as, for example, a microphone. A microphone that has limited dynamic range with may create microphone hiss in an output signal generated by the microphone. The microphone hiss may prevent a reproduction of a sound field, represented in an output signal of the microphone, from being perceived as a natural environment. The microphone frequency spectrum characteristics (a.k.a. microphone frequency spectrum) may be obtained using static measurements or calculated dynamically. A virtual noise floor may be calculated responsive to the microphone frequency spectrum and a desired noise floor. Gain coefficients may be calculated responsive to the output signal of the microphone (a.k.a. the microphone signal). The gain coefficients may be calculated to mitigate undesirable signal content including background noise and echoes. The calculated gain coefficients may be modified responsive to the virtual noise floor. The modified gain coefficients may allow a reproduction of the sound field to be perceived as a natural environment.

Figure 1:
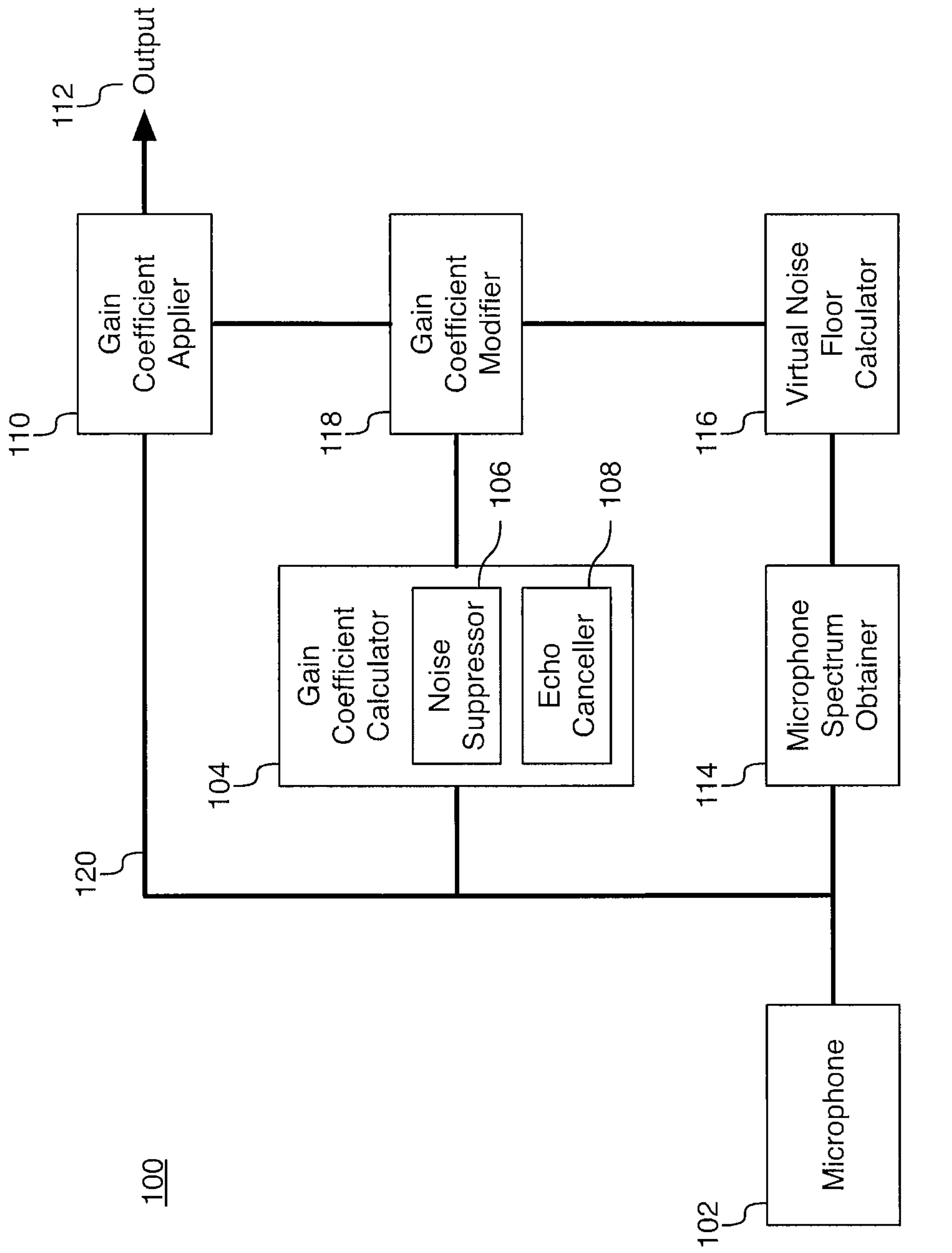
FIG. 1 is a schematic representation of a system for mitigating microphone hiss.

FIG. 1 is a schematic representation of a system for mitigating microphone hiss. One or more microphones 102 may receive a sound field. The sound field is a representation of an audible environment associated with the microphone 102. Many audible environments associated with the microphone 102 may include undesirable content that may be mitigated by processing a microphone signal 120 derived from the received sound field. Microphones 102 that are arranged in a far field configuration typically receive more undesirable content (a.k.a. noise) than microphones 102 in a near field configuration. Far field configurations may include, for example, a hands free phone, a conference phone and microphones embedded into an automobile. Far field configurations are capable of receiving a sound field that represents the spatial environment associated with the microphones 102. Near field configurations typically place the microphone 102 in close proximity to a sound source (e.g. a user). Undesirable content may be mitigated in both near and far field configurations by processing the microphone signal 120 derived from the received sound field.

There are many types of microphones 102 each designed for different applications. The microphone 102 may be chosen for an application based on cost, size or dynamic range over a specified frequency range (a.k.a. frequency response). For example, a microphone 102 utilized in a professional recording application may have a large dynamic range close to the range of human perception from 0 Hz to 16 kHz. The microphone 102 utilized in a mobile phone may have an acceptable dynamic range for speech content from 0 Hz to 5 kHz. The microphones 102 utilized in the mobile phone may be selected for cost reasons but often the dynamic range over a give frequency range may be limited because of the physical size of the microphone. Mobile phones, and many other computing devices, utilize small microphones because of the small physical size of the computing devices. Physically small microphones may have limitations of the dynamic range over a given frequency range. A common limitation may be limited dynamic range. The limited dynamic range may be audible even in the presence of a completely silent environment. The limited dynamic range may be heard as microphone hiss in the output signal of the microphone.

Figure 4:
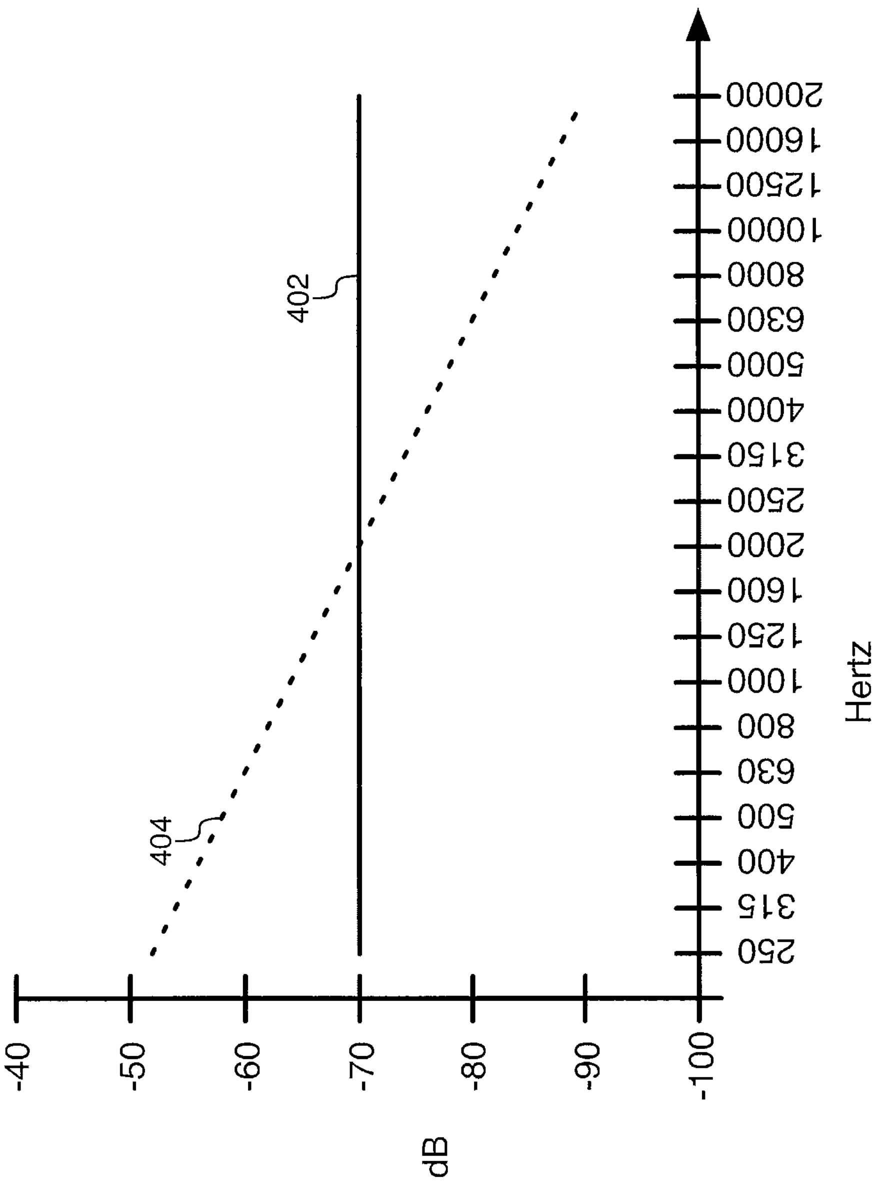
FIG. 4 is a graphical representation of a microphone frequency spectrum including microphone hiss and a virtual noise floor.

FIG. 4 is a graphical representation of a microphone frequency spectrum including microphone hiss and a virtual noise floor. The example microphone frequency spectrum 402 shows a frequency spectrum that may be acceptable for some applications below approximately 5 kHz where the level of microphone hiss is acceptable but frequencies greater than 5 kHz the level microphone hiss is unacceptable. Some narrow band applications including those primarily directed toward speech communication may find the microphone frequency spectrum 402 to be acceptable. Wide band applications attempting to receive, for example, a sound field to capture speech, music and the associated audible environment may find the microphone frequency spectrum 402 unacceptable due to the microphone hiss. Narrow band applications may digitally sample the microphone 102 at 8 kHz whereas wide band applications may sample the microphone 102 at higher sampling rates. Common higher sampling rates may include 16 kHz, 24 kHz, 44.1 kHz and 48 kHz. In a natural, quiet environment, a user may perceive the combined noise of the environment and the microphone hiss.

Processing that may mitigate undesirable content received in the sound field may include a gain coefficient calculator 104. The gain coefficient calculator 104 may comprise one or more of a noise suppressor 106 and an echo canceller 108. The echo canceller 108, noise suppressor 106 and other audio processing processes may calculate one or more gain coefficients, or suppression gains. The echo canceller 108 and the noise suppressor 106 may each calculate one or more gain coefficients. Each respective gain coefficient may be applied individually or a composite gain coefficient may be applied to process the sound field using a gain coefficient applier 110.

The echo canceller 108 mitigates echoes caused by signal feedback between two or more communication devices. Signal feedback occurs when an audio transducer on a first communication device reproduces the signal received from a second communication device and subsequently the microphones on the first communication device recapture the reproduced signal. The recaptured signal may be transmitted to the second communication device where the recaptured signal may be perceived as an echo of the previously transmitted signal. The echo canceller 108 may detect when a portion of the received signal has been recaptured and attempt to suppress the recaptured portion of the signal. Many different types of echo cancellers 108 may mitigate echoes by calculating one or more gain coefficients that, when applied to the signals received by the microphone 102, suppress the echoes. In one example implementation, the echo canceller 108 may calculate gain coefficients using a coherence calculation between near and far signals disclosed in U.S. Pat. No. 8,036,879, which is incorporated herein by reference, except that in the event of any inconsistent disclosure or definition from the present specification, the disclosure or definition herein shall be deemed to prevail. Alternatively or in addition, the echo canceller 108 may use other mechanisms.

Background noise is another type of undesirable signal content that may be mitigated by processing the microphone signal 120. Many different types of noise suppressor 106 techniques may mitigate background noise. An exemplary noise suppressor 106 is a recursive Wiener filter. The Wiener suppression gain $G_{i,k}$, or gain coefficient, is defined as $$G_{i,k} = \frac{S\hat{N}R_{priori_{i,k}}}{S\hat{N}R_{priori_{i,k}} + 1}. \tag{1}$$

Where $S\hat{N}R_{priori_{i,k}}$ is the a priori SNR estimate and is calculated recursively by:

$$S\hat{N}R_{priori_{i,k}} = G_{i-1,k} S\hat{N}R_{post_{i,k}} - 1. \tag{2}$$

Where $S\hat{N}R_{post_{i,k}}$ is the a posteriori SNR estimate given by:

$$S\hat{N}R_{post_{i,k}} = \frac{|Y_{i,k}|^2}{|\hat{N}_{i,k}|^2}. \tag{3}$$

Where $|\hat{N}_{i,k}|$ is a background noise estimate. In one example implementation, the background noise estimate, or signal values, may be calculated using the background noise estimation techniques disclosed in U.S. Pat. No. 7,844,453, which is incorporated herein by reference, except that in the event of any inconsistent disclosure or definition from the present specification, the disclosure or definition herein shall be deemed to prevail. In other implementations, alternative background noise estimation techniques may be used, such as, for example, a noise power estimation technique based on minimum statistics. Alternatively or in addition, the noise suppressor 106 may use other mechanisms.

Noise suppression techniques including the exemplary Wiener filter described above may mitigate some microphone hiss. Mitigating microphone hiss using standard noise suppression may reduce the audible hiss created by the microphone 102 although the resulting output 112 may not be perceived as a natural environment. Natural environments, for example a room response, may have a noise floor that changes at a rate of 1/frequency, or −6 dB per octave. A noise floor that changes at a rate of approximately −5 dB to −7 dB per octave may be perceived as a natural environment. The noise suppressor 106 may reduce the amount of hiss created by the microphone 102 but the result may not be perceived as a natural environment. The noise suppressor 106 may generate gain coefficients that result in an output 112 that is perceived as a natural environment when the generated gain coefficients are modified to simulate a natural environment. For example, gain coefficients that result in an output 112 where the hiss noise changes at a rate of approximately −6 dB per octave may be perceived as a natural environment.

A microphone spectrum obtainer 114 may obtain the microphone frequency spectrum 402. The microphone spectrum obtainer 114 may obtain the microphone frequency spectrum 402 utilizing an offline measurement tool. Alternatively or in addition, the microphone spectrum obtainer 114 may obtain the microphone frequency spectrum 402 dynamically by analyzing the microphone signal 120 over time and frequency. Obtaining a dynamic frequency spectrum 402 may include utilizing the background noise estimate.

A virtual noise floor calculator 116 may calculate a virtual noise floor 404 that simulates (e.g. approximates) a natural environment. The microphone hiss may distort the audible environment received by the microphone 102 when reproduced in an output 112. The output 112 when reproduced with the virtual noise floor 404 may be perceived as a more natural environment. The virtual noise floor 404 may be calculated responsive to the microphone frequency spectrum 402. For example, the virtual noise floor calculator 116 may calculate the virtual noise floor 404 starting from a frequency beyond which microphone hiss may become audible when compared to a natural environment. The virtual noise floor calculator 116 may update the virtual noise floor 404 as the microphone frequency spectrum 402 changes responsive to the microphone spectrum obtainer 114. The virtual noise floor 404 may be responsive to detected signal content. For example if no signal content is detected above 10 kHz, comfort noise may be added to the level of the virtual noise floor 404.

A gain coefficient modifier 118 may modify the gain coefficients calculated by the gain coefficient calculator 104. The gain coefficient modifier 118 may modify the gain coefficients responsive to the virtual noise floor 404 calculated by the virtual noise floor calculator 116. The gain coefficient modifier 118 may modify the gain coefficients by increasing or decreasing the value of the gain coefficients. The gain coefficients from the example Wiener filter described above may be modified by limiting the gain coefficients to track the virtual noise floor 404. The gain coefficient modifier 118 may use the following equation to modify the gain coefficients where η(k) represents the virtual noise floor 404:

$$\hat{G}_{i,k} = \max(\eta(k), G_{i,k}). \tag{4}$$

Equation 4 limits the gain coefficients calculated by the Wiener filter from suppressing noise below the virtual noise floor 404. An alternative gain coefficient modifier 118 may filter, or smooth, the gain coefficients over time and/or frequency. The gain coefficients may be modified resulting in the output 112 being below the virtual noise floor 404 responsive to a different limiting method and/or filtering. Gain coefficients that result in the output 112 being substantially lower than the virtual noise floor 404 may be perceived as a different type of natural environment including for example a large room as compared to a small room. Typically, the gain coefficient modifier 118 allows more noise removal with increasing frequency. For example, 20 dB (decibel) of noise removal between 8 to 10 kHz and 30 dB of noise removal between 15 to 20 kHz.

Gain coefficients calculated with the echo canceller 108 may be modified by the gain coefficient modifier 118 in accordance with equation 4. In an alternative example, additional noise may be added to the signal after the echo canceller 108 to obtain an output 112 that is approximately the same energy level as the virtual noise floor 404. The additional noise may be comfort noise with substantially the same energy level as the virtual noise floor. The comfort noise may be added for any gain coefficient calculator 104.

A subband filter may process the signal from the microphone 102 to extract frequency information. The subband filtering may be accomplished by various methods, such as a Fast Fourier Transform (FFT), critical filter bank, octave filter band, or one-third octave filter bank. Alternatively, the subband analysis may include a time-based filter bank. The time-based filter bank may be composed of a bank of overlapping bandpass filters, where the center frequencies have non-linear spacing such as octave, $3^{rd}$ octave, bark, mel, or other spacing techniques. The one or more gain coefficients may be calculated for each frequency bin or band of the subband filter.

Figure 2:
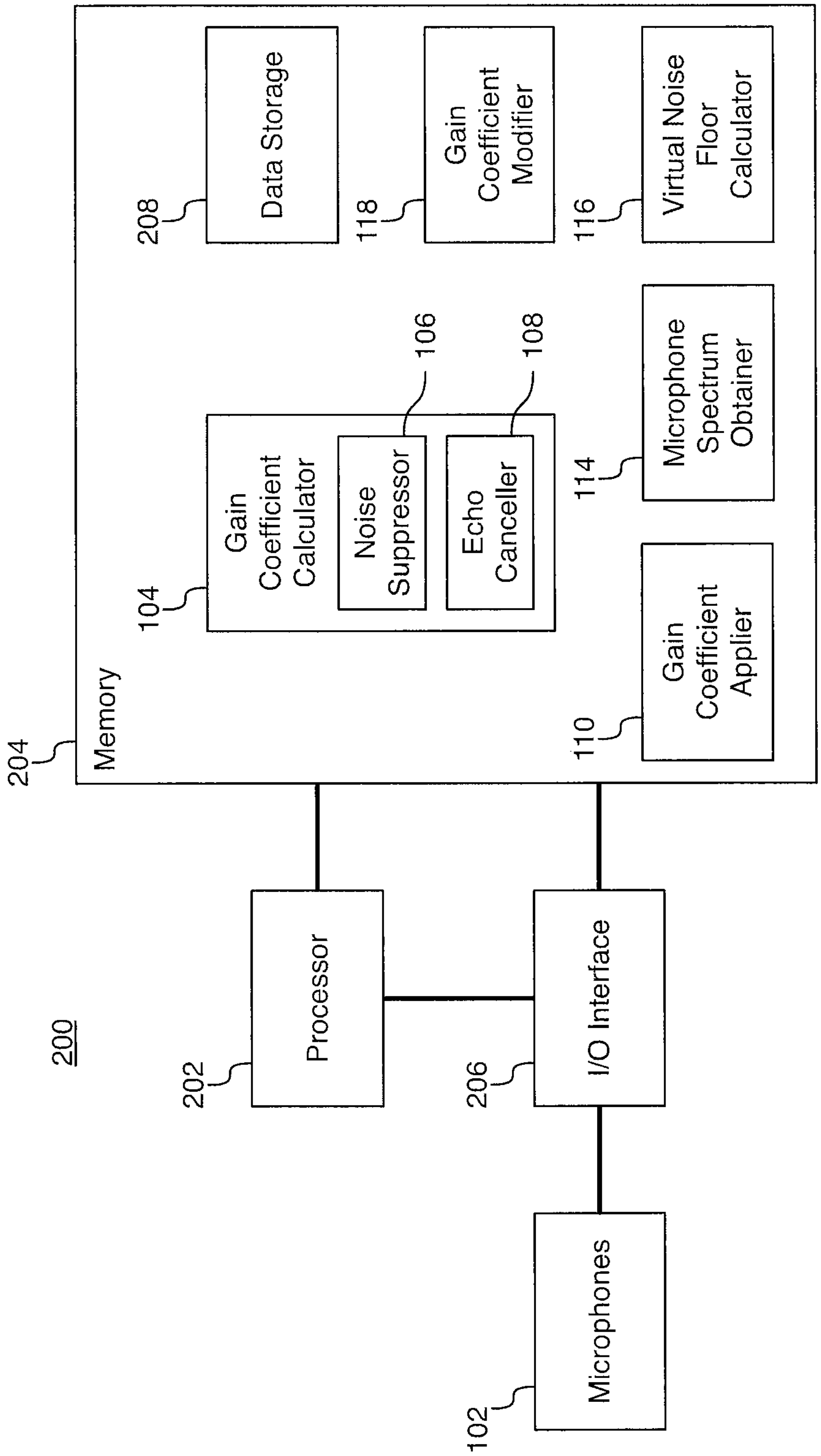
FIG. 2 is a further schematic representation of a system for mitigating microphone hiss.
Figure 3:
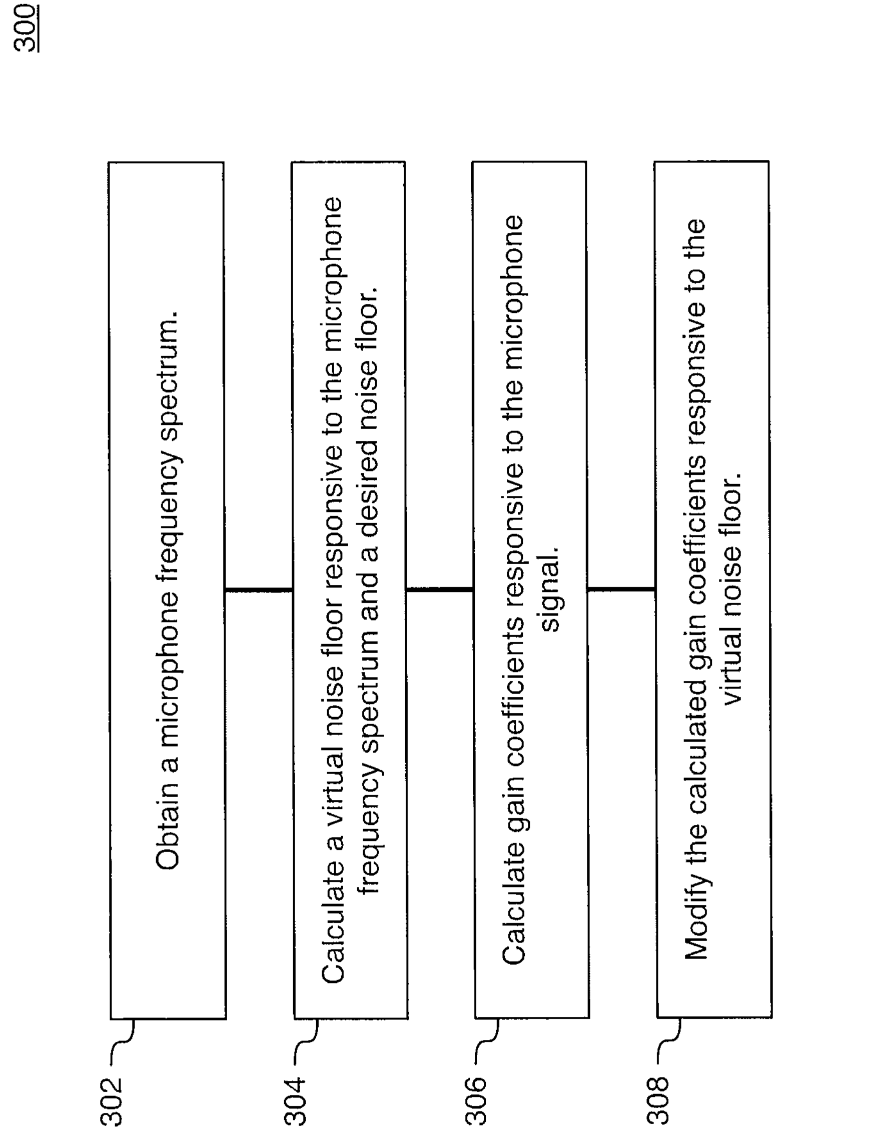
FIG. 3 is a flow diagram representing a method for mitigating microphone hiss.

FIG. 3 is a flow diagram representing a method for mitigating microphone hiss. The method 300 may be, for example, implemented using the systems 100 and 200 described herein with reference to FIGS. 1 and 2. The method 300 includes the act of obtaining a microphone frequency spectrum. A virtual noise floor may be calculated responsive to the microphone frequency spectrum and a desired noise floor 304. Gain coefficients may be calculated responsive to the microphone signal 306. The calculated gain coefficients may be modified responsive to the virtual noise floor 308.

FIG. 2 is a further schematic representation of a system for mitigating microphone hiss. The system 200 comprises a processor 202, memory 204 (the contents of which are accessible by the processor 202), microphones 102 and an I/O interface 206. The memory 204 may store instructions which when executed using the process 202 may cause the system 200 to render the functionality associated with mitigating microphone hiss as described herein. For example, the memory 204 may store instructions which when executed using the process 202 may cause the system 200 to render the functionality associated with the gain coefficient calculator module 104, the noise suppressor module 106, the echo canceller module 108, the gain coefficient applier module 110, the microphone spectrum obtainer module 114, the virtual noise floor calculator 116 and the gain coefficient modifier module 118 described herein. In addition, data structures, temporary variables and other information may store data in data storage 208.

The processor 202 may comprise a single processor or multiple processors that may be disposed on a single chip, on multiple devices or distributed over more that one system. The processor 202 may be hardware that executes computer executable instructions or computer code embodied in the memory 204 or in other memory to perform one or more features of the system. The processor 202 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 204 may comprise a device for storing and retrieving data, processor executable instructions, or any combination thereof. The memory 204 may include non-volatile and/or volatile memory, such as a random access memory (RAM), a read-only memory (ROM), an erasable programmable read-only memory (EPROM), or a flash memory. The memory 204 may comprise a single device or multiple devices that may be disposed on one or more dedicated memory devices or on a processor or other similar device. Alternatively or in addition, the memory 204 may include an optical, magnetic (hard-drive) or any other form of data storage device.

The memory 204 may store computer code, such as the gain coefficient calculator module 104, the noise suppressor module 106, the echo canceller module 108, the gain coefficient applier module 110, the microphone spectrum obtainer module 114, the virtual noise floor calculator 116 and the gain coefficient modifier module 118 as described herein. The computer code may include instructions executable with the processor 202. The computer code may be written in any computer language, such as C, C++, assembly language, channel program code, and/or any combination of computer languages. The memory 204 may store information in data structures including, for example, gain coefficients and state variables.

The I/O interface 206 may be used to connect devices such as, for example, the microphone 102, and to other components of the system 200.

All of the disclosure, regardless of the particular implementation described, is exemplary in nature, rather than limiting. The system 100 and 200 may include more, fewer, or different components than illustrated in FIG. 2. Furthermore, each one of the components of system 100 and 200 may include more, fewer, or different elements than is illustrated in FIGS. 1 and 2. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in spectrum to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for mitigating microphone hiss have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A computer implemented method for mitigating microphone hiss comprising:

obtaining a microphone frequency spectrum;

establishing a virtual noise floor responsive to the microphone frequency spectrum and a desired noise floor comprising a predetermined desired room response;

calculating gain coefficients responsive to a microphone signal; and modifying the calculated gain coefficients responsive to the virtual noise floor.

2. The method for mitigating microphone hiss of claim 1, where the microphone frequency spectrum comprises a statically or dynamically calculated measurement.

3. The method for mitigating microphone hiss of claim 1, where obtaining the microphone frequency spectrum comprises a calculation responsive to the microphone signal and a background noise estimate.

4. The method for mitigating microphone hiss of claim 1, where the virtual noise floor comprises the predetermined desired room response across a range of frequencies.

5. The method for mitigating microphone hiss of claim 1, where calculating gain coefficients comprises one or more of a noise suppressor and an echo canceller.

6. The method for mitigating microphone hiss of claim 5, where the echo canceller further comprises adding comfort noise responsive to the virtual noise floor.

7. The method for mitigating microphone hiss of claim 5, where the noise suppressor further comprises adding comfort noise responsive to the virtual noise floor.

8. The method for mitigating microphone hiss of claim 1, where the gain coefficient modifier comprises limiting the gain coefficients to the virtual noise floor.

9. The method for mitigating microphone hiss of claim 1, further comprising generating a set of sub-bands of the microphone signal through a subband filter or a Fast Fourier Transform.

10. The method for mitigating microphone hiss of claim 1, further comprising generating a set of sub-bands of the microphone signal according to a critical, octave, mel, or bark band spacing technique.

11. A system for mitigating microphone hiss comprising:

a microphone spectrum obtainer to obtain a microphone frequency spectrum;

a virtual noise floor device that establishes a virtual noise floor responsive to the microphone frequency spectrum;

a gain coefficient calculator to calculate gain coefficients responsive to a microphone signal; and a gain coefficient modifier to modify the calculated gain coefficients responsive to the virtual noise floor;

where the virtual noise floor comprises a predetermined desired room response.

12. The system for mitigating microphone hiss of claim 11, where the microphone frequency spectrum comprises a predetermined measurement.

13. The system for mitigating microphone hiss of claim 11, where the microphone spectrum obtainer comprises a calculation responsive to the microphone signal and a background noise estimate.

14. The system for mitigating microphone hiss of claim 11, where the virtual noise floor comprises the predetermined desired room response across a range of frequencies.

15. The system for mitigating microphone hiss of claim 11, where the gain coefficient calculator comprises one or more of a noise suppressor and an echo canceller.

16. The system for mitigating microphone hiss of claim 15, where the echo canceller adds comfort noise responsive to the virtual noise floor.

17. The system for mitigating microphone hiss of claim 15, where the noise suppressor adds comfort noise responsive to the virtual noise floor.

18. The system for mitigating microphone hiss of claim 11, where the gain coefficient modifier limits the gain coefficients to the virtual noise floor.

19. The system for mitigating microphone hiss of claim 11, further comprising means to generate a set of sub-bands of the microphone signal through a subband filter or a Fast Fourier Transform.

20. The system for mitigating microphone hiss of claim 11, further comprising means to generate a set of sub-bands of the microphone signal according to a critical, octave, mel, or bark band spacing technique.

* * * * *